(12) United States Patent
Grover et al.

(10) Patent No.: US 6,914,880 B1
(45) Date of Patent: Jul. 5, 2005

(54) PROTECTION OF ROUTERS IN A TELECOMMUNICATIONS NETWORK

(75) Inventors: Wayne D. Grover, Edmonton (CA); Demetrios Stamatelakis, Edmonton (CA)

(73) Assignee: Telecommunications Research Laboratories, Edmonton (CA)

(*) Notice: Subject to any disclaimer, the term of this patent is extended or adjusted under 35 U.S.C. 154(b) by 0 days.

(21) Appl. No.: 09/314,518

(22) Filed: May 19, 1999

(30) Foreign Application Priority Data

Apr. 22, 1999 (CA) .................................... 2269649

(51) Int. Cl.⁷ ............................................ G01R 31/08
(52) U.S. Cl. ...................................... 370/221; 370/216
(58) Field of Search ............................... 709/239, 241, 709/242; 359/110; 370/216, 217, 218, 219, 220, 221, 222, 223, 224, 225, 226, 227, 228, 237, 238, 238.1

(56) References Cited

U.S. PATENT DOCUMENTS

| | | | | |
|---|---|---|---|---|
| 4,679,189 A | * | 7/1987 | Olson et al. ................ | 370/396 |
| 4,769,815 A | * | 9/1988 | Hinch et al. ................ | 370/236 |
| 5,751,696 A | * | 5/1998 | Bechtel et al. .............. | 370/223 |
| 5,850,505 A | | 12/1998 | Grover et al. ........ | 395/182.02 |
| 5,884,017 A | | 3/1999 | Fee ....................... | 395/182.02 |
| 6,147,968 A | * | 11/2000 | De Moer et al. ........... | 370/225 |
| 6,331,905 B1 | * | 12/2001 | Ellinas et al. .............. | 395/110 |
| 6,404,734 B1 | * | 6/2002 | Stamatelakis et al. ...... | 370/227 |
| 6,421,349 B1 | | 7/2002 | Grover ...................... | 370/408 |

FOREIGN PATENT DOCUMENTS

| | | |
|---|---|---|
| WO | WO 96/21236 | 7/1996 |
| WO | WO 98/33287 | 7/1998 |

OTHER PUBLICATIONS

Canadian Patent Application No. 2,161,847, published May 1, 1997, corresponding to U.S. 5,850,505, Grover et al.
Canadian Patent Application No. 2,210,207, published Jan. 11, 1999, corresponding to U.S. 6,421,349, Grover et al.
Cycle–Oriented Distributed Preconfiguration: Ring–like Speed with Mesh–like Capacity for Self–planning Network Restoration, Wayne D. Grover, Demetrios Stamatelakis, Jun. 1998, Proc. ICC'98, 7 pages.
Self–Organizing Closed Path Configruation of Restoration Capacity in Broadband Mesh Transport Networks, Wayne D. Grover, Demetrios Stamatelakis, Jun. 1998, Proc. CCBR'98, 12 pages.
Theory and Algorithms for Preconfiguration of Spare Capacity In Mesh Restorable Networks, Thesis by Demetrios Stamatelakis, Master of Science Degree, University of Alberta, Catalogued Nov., 1997, 173 pages in total.
Candian Intellectual Property Office, Examination Report for App. No. 2,269,649, Feb. 2003.

* cited by examiner

Primary Examiner—Duc Ho
Assistant Examiner—Thien D Tran
(74) Attorney, Agent, or Firm—Flynn, Thiel, Boutell & Tanis, P.C.

(57) ABSTRACT

A method of configuring a node in an IP network by creating a set of router table entries which form a set of virtually preconfigured cyclical routes, or p-cycles, within the IP network. This set of p-cycles is virtual in the sense that the only resources which they normally consume are routing table entries. No transmission capacity is required for them, unless/until they are used to carry packets (traffic.) These p-cycles sit idle and unused until a failure takes place. The routers surrounding the failure then use these p-cycles to route packets, which normally would be lost, around the failure. A router having an entry in its router table identifying the p-cycle, together with an associated port, is also disclosed, and also a data packet that may use a p-cycle to get to its destination.

13 Claims, 9 Drawing Sheets

PROTECTION OF ROUTERS IN A TELECOMMUNICATIONS NETWORK

FIELD OF THE INVENTION

This invention relates to methods and node configurations for protecting routers against router failure in a telecommunications network.

BACKGROUND OF THE INVENTION

Internet protocol (IP) networks are a form of packet-based network. Packet are routed in an IP network by the use of routers, which form the nodes of an IP network (node and router can be used interchangeably in this document.) When a router receives an IP packet, it makes the decision of which adjacent router to send the packet to by consulting its local routing tables. The router table entries are indexed by the destination IP address, which is contained in the header of every IP packet. An entry for a destination IP address will generally contain a path cost and a destination address. The path cost is the cost of the previously determined lowest cost path between the router. The destination address is the local router port which will carry the packet to the next router on the path towards the destination address. These routing table entries are determined by the use of a routing protocol (most commonly OSPF in larger IP networks). Thus, an IP packet is generally routed from its source to destination by a series of routers with each router sending the packet closer to its destination by consulting its local routing table. The implication of this is that no high level coordination or setup of the route the packet takes is required; the route the packet takes is determined directly by the sequence of routers it ends up taking.

Traditionally, an IP network's routers restore any failures which take place by execution of the routing protocol to update the router table entries. However, this can take up to a minute with OSPF (and possibly longer with simpler routing protocols) and until the update takes places the packets which previously would have been routed by a router over/to the failed equipment are simply discarded. This leads to a loss of service quality and availability.

SUMMARY OF THE INVENTION

According to an aspect of the invention, there is provided a method of configuring a node in an IP network by creating a set of router table entries which form a set of virtually preconfigured cyclical routes, or p-cycles, within the IP network. This set of p-cycles are virtual in the sense that the only resources which they normally consume are routing table entries. No transmission capacity is required for them, unless/until they are used to carry packets (traffic.) These p-cycles sit idle and unused until a failure takes place; the routers surrounding the failure then use these p-cycles to route packets, which normally would be lost, around the failure.

According to an aspect of the invention, there is also provided a protected router, comprising a router table, the router table having an entry identifying a cycle of routers encircling an adjacent router to the protected router and a port associated with that entry. The cycle of routers includes all routers logically adjacent to the adjacent router and not the adjacent router.

According to a further aspect of the invention, there is provided a telecommunications network having at least one protected router, and preferably all the routers being protected against failure of adjacent routers.

According to a further aspect of the invention, there is provided a novel data packet comprising an ID field that specifies a p-cycle in which the routers in the p-cycle are all adjacent a router not in the p-cycle, a path cost field and a data field.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, "comprising" means "including". In addition, a reference to an element by the indefinite article "a" does not exclude the possibility that more than one of the element is present.

Node Protection of Routers Using p-Cycles

A p-cycle is found for each potential node failure. Various methods can be used to find a p-cycle for each potential node failure including manual and automatic methods. These p-cycles are to be used to route packets, which normally would be lost, around the failure. This section will focus on the recovery of node failures, but a direct implication of a node failure being directly restorable is that any link (connection between a pair of routers) is also restorable. A p-cycle which can protect the traffic which was routed through a node failure should have two properties: first, it does not contain the node which it is protecting, and, second, it does contain all the nodes which are logically adjacent (directly connected) to the protected node. The p-cycle has a hop count lower than any other p-cycle that encircles the node. In general, it may not be possible to always find a simple cycle with these properties (a simple cycle is one which crosses each node, at most once) so cycles which cross a node more than once may also need to be considered.

Figure 1B:
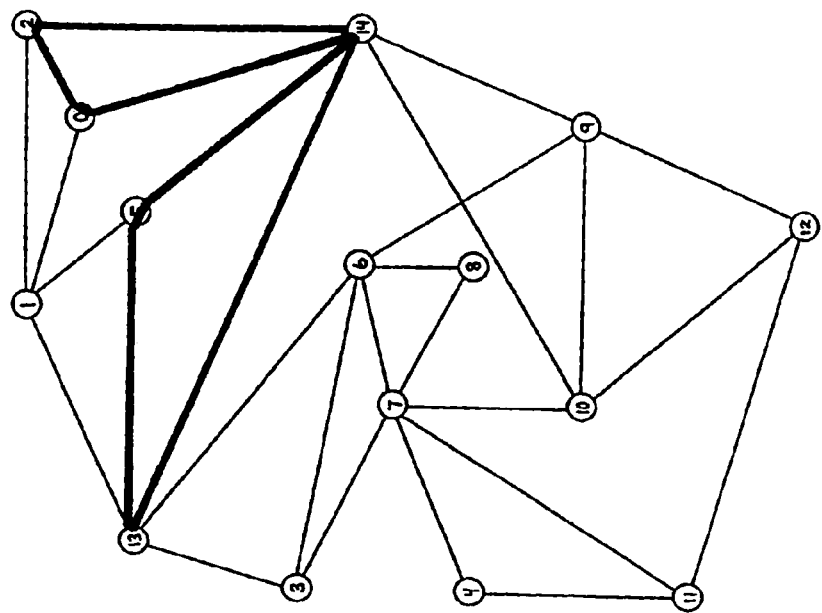
FIGS. 1A–1I show examples of node encircling cycles for respectively nodes 0, 1, 10, 11, 8, 9, 12, 13 and 14 according to the invention.
Figure 1A:
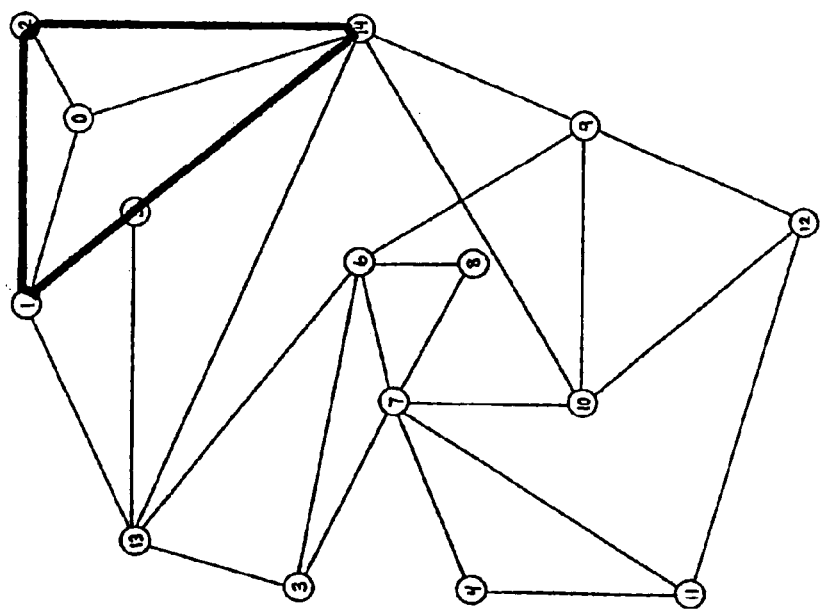
Figure 1D:
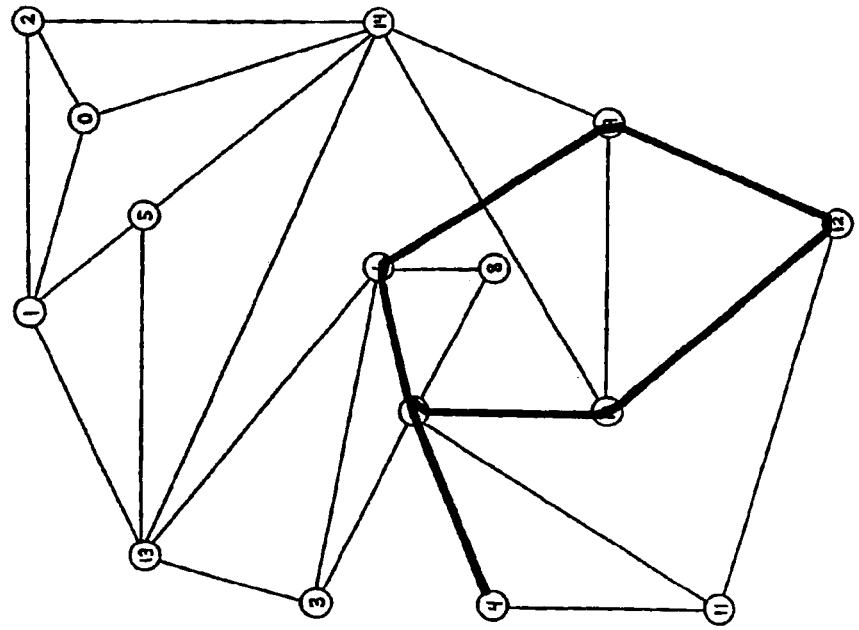
Figure 1C:
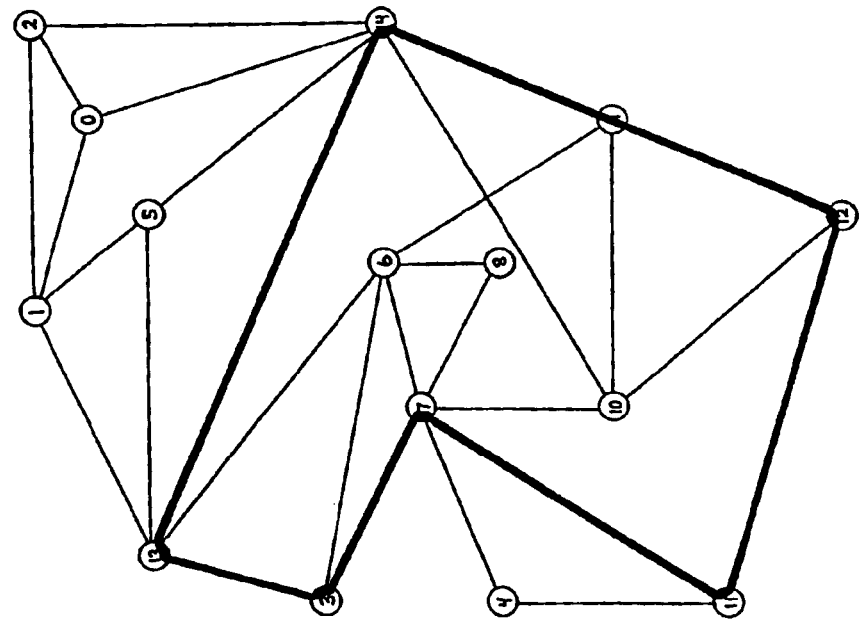
Figure 1F:
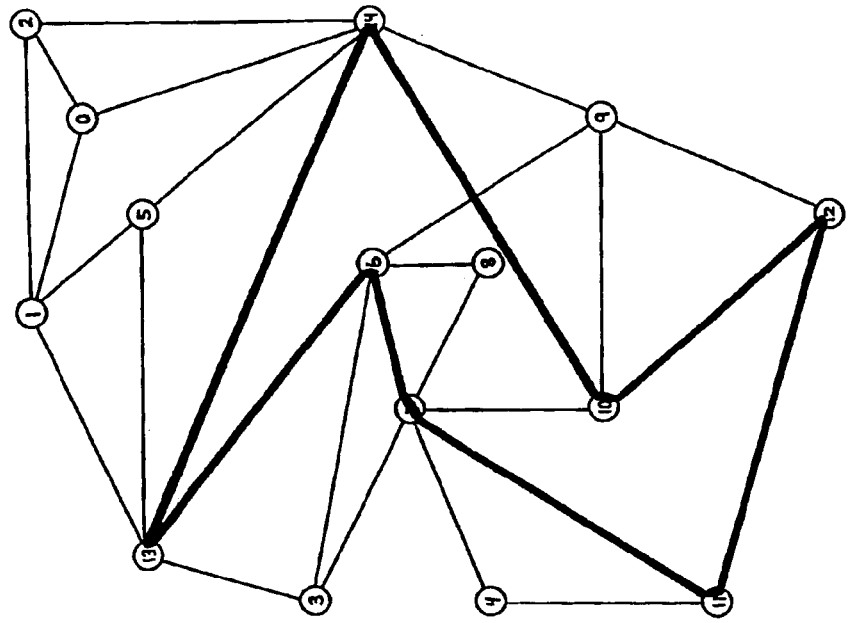
Figure 1E:
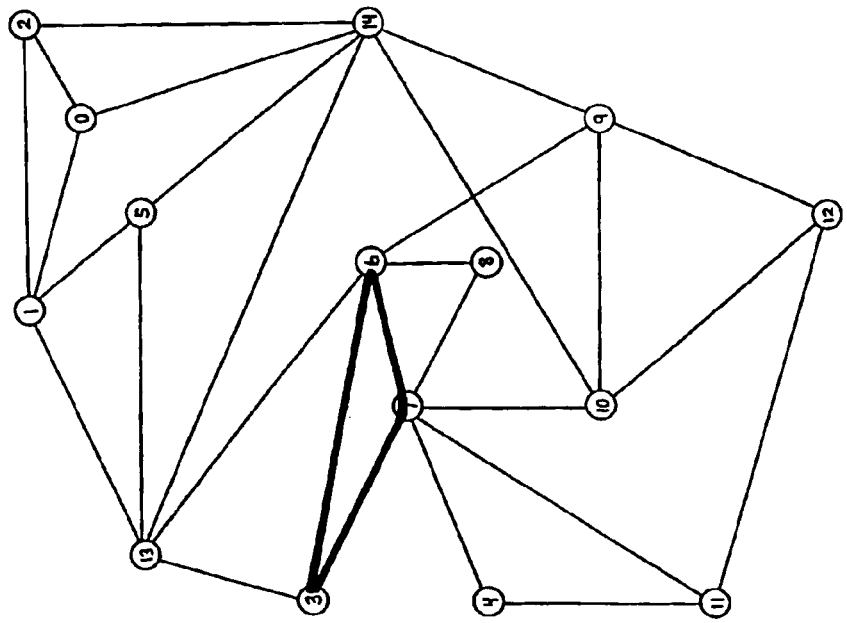
Figure 1H:
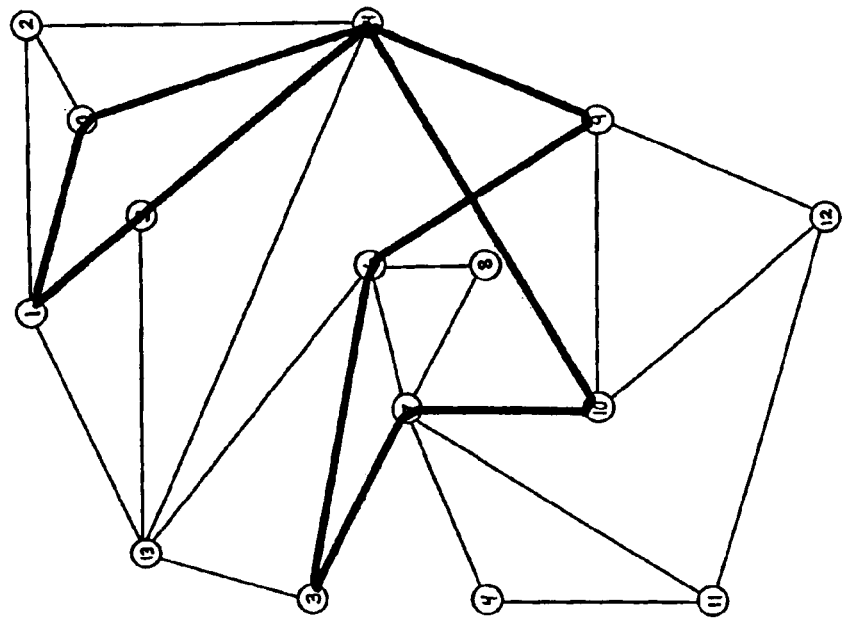
Figure 1G:
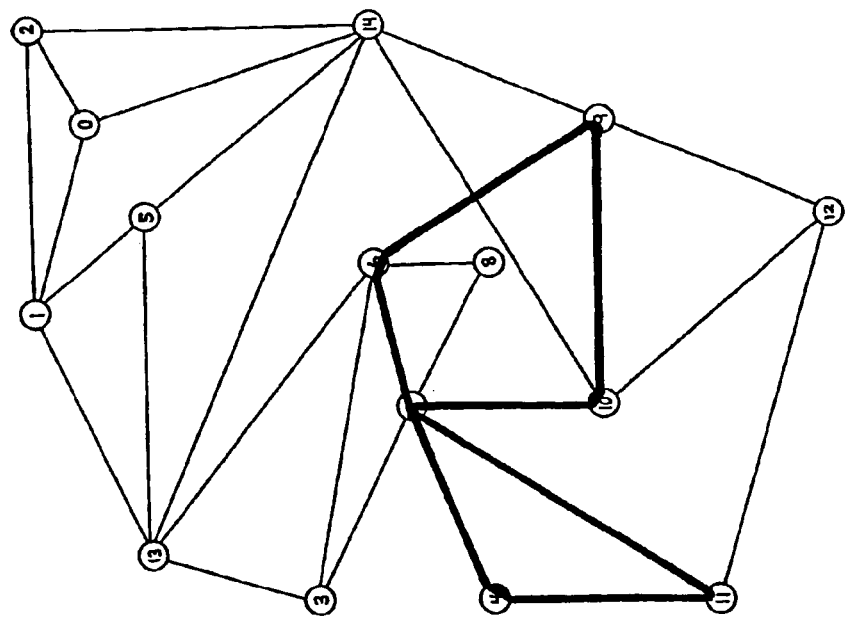
Figure 1I:
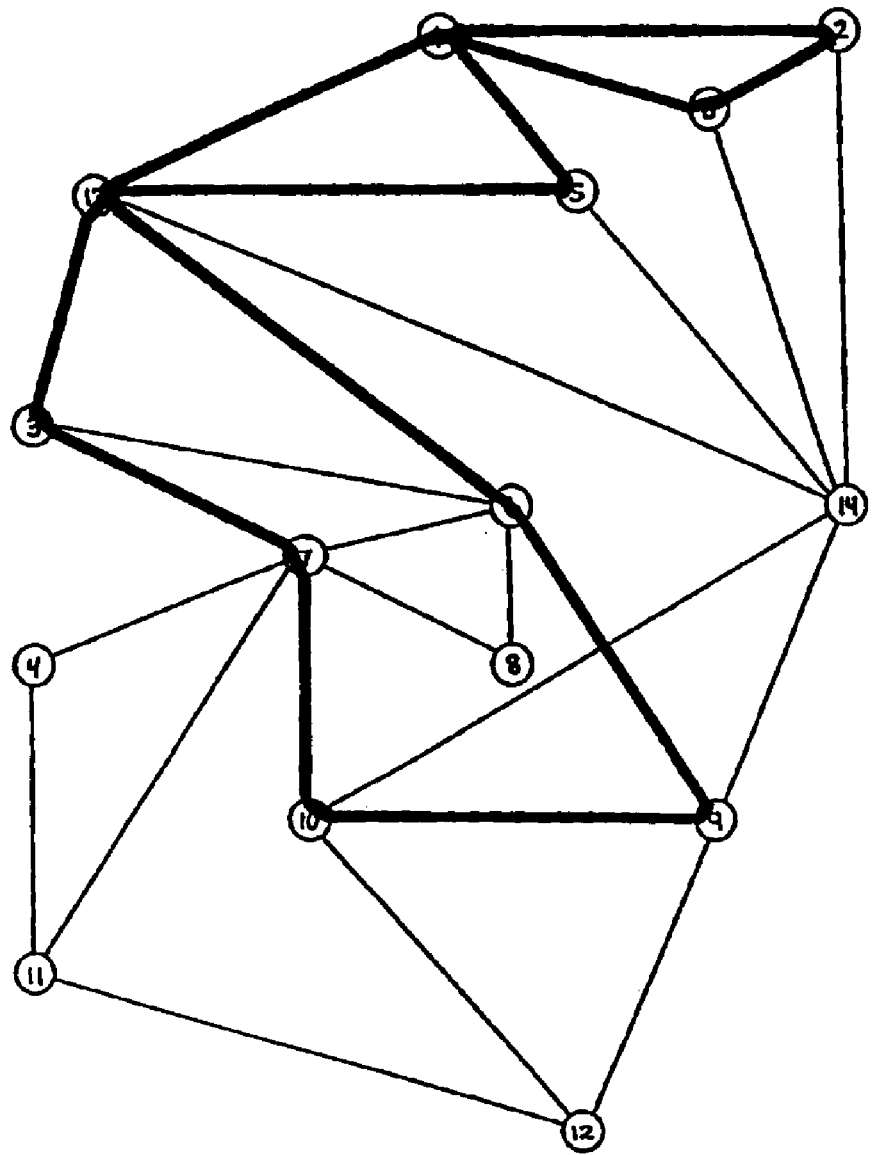

Examples of simple and non-simple cycles are given in FIGS. 1A–1I for various nodes in a 15 node network. FIG. 1A shows an example of a graphically apparent encircling p-cycle for node 0. FIG. 1B shows an example of a graphically non-apparent encircling p-cycle for node 1, in which the p-cycle forms a figure 8. FIG. 1C shows an example of a graphically apparent encircling p-cycle for node 10, which requires inclusion of node 13, not adjacent to node 10, for its construction. FIG. 1D shows an example of a logically encircling p-cycle for node 11, which has a stub, equivalent to a same span figure 8. FIG. 1E shows an example of a graphically non-apparent logically encircling p-cycle for node 8. FIG. 1F shows an example of a graphically non-apparent logically encircling p-cycle for node 9. FIG. 1G shows an example of an encircling p-cycle for node 12. FIG. 1H shows an example of an encircling p-cycle for node 13. FIG. 1I shows an example of an encircling p-cycle for node 14. Thus, it is seen that encircling p-cycles may be visually (graphically) apparent, may require a figure 8, and/or may be non-apparent, that is, not graphically encircling, but still be logically encircling. It is preferred that the set of p-cycles in a network be selected to minimize the number of p-cycles protect all nodes. One way to look at a p-cycle associated with a router is that it should intercept all traffic flows through the router. The node IDs for a p-cycle belonging to a router are stored in all routers in the p-cycle.

A p-cycle, with the properties described in the previous paragraph, can compensate for the loss of the failed node, by offering the lost node's adjacent nodes (which are the only nodes which can route packets to the dead node) an alternate path around the failed node. The cycle covers all the node's adjacent neighbors so a path between them is always possible. So if a node would have routed a packet to a lost node, but detects that the node is now lost, it can divert the packet onto the p-cycle which has been predefined to protect the lost node. The packet then travels the perimeter of the protecting p-cycle, being passed from router to router, until it arrives at a router who "knows" what to do with the packet; at this point the packet is routed normally towards its final destination.

Figure 2B:
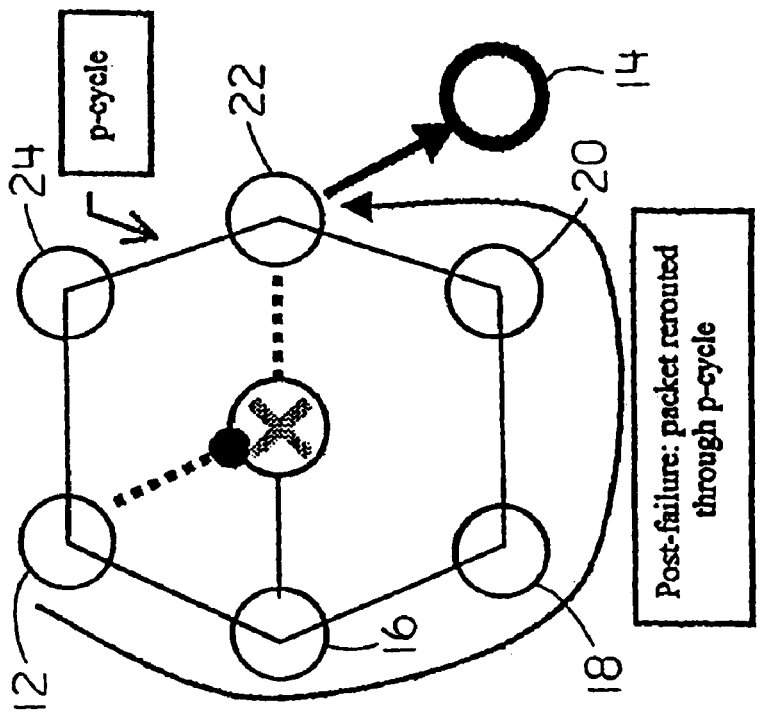
FIGS. 2A and 2B show re-routing of a packet through a p-cycle.
Figure 2A:
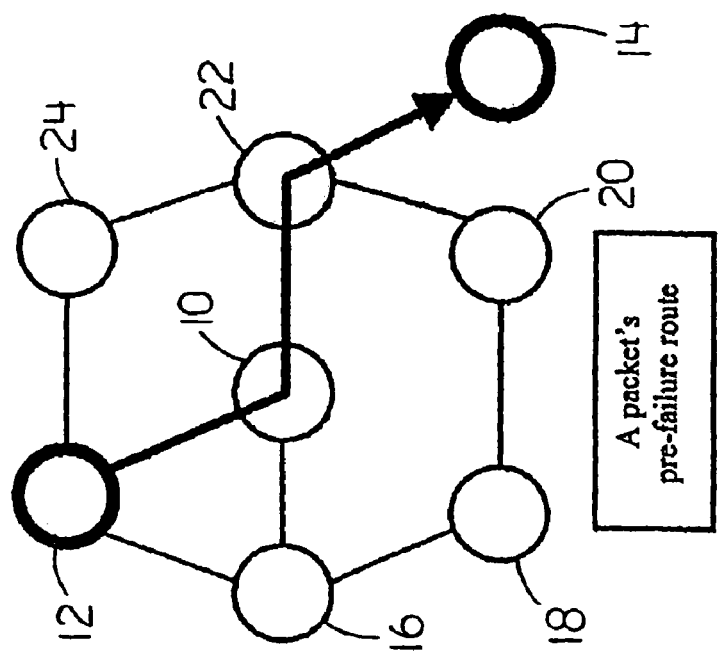

This rerouting of the packet, within the p-cycle, can occur because a router can only route a packet to/from the routers that are immediately adjacent to the router. Therefore, when a router fails, a p-cycle, with the properties described above, can be used to detour packets between pairs of routers that would originally have used the failed router. The p-cycle is guaranteed to provide this detour because it is designed to cover all the failed router's adjacent neighbors and to not contain the failure node. An example of this packet rerouting is given in FIGS. 2A and 2B. In FIG. 2A, if the router 10 fails, a packet being sent from source node 12 to destination node 14 is routed as shown in FIG. 2B around nodes 16, 18, 20 and 22 which form part of a p-cycle surrounding node 10. The complete cycle also includes nodes 12, 14 and 24.

Because a p-cycle can only be formed as a virtual circuit within a packet switched IP network, a p-cycle does not use any transmission capacity unless it is actually used. For example, in node protection it is conceivable that a separate p-cycle will be formed for each network router. However, in normal operation these cycles will not use any transmission capacity. Only when a node in the network fails would a p-cycle utilize capacity to detour packets around the failure. This is in contrast to a circuit switched network where protection capacity used to form a p-cycle would use up the capacity regardless of if it is used to restore a failure.

Use of P-Cycles to Restore Failures

As previously discussed a p-cycle restores a failure by providing a detour for a packet around a node failure. The packet is rerouted through the p-cycle until it reaches a router that is able to remove the packet from the p-cycle and route it normally. Some simple rules are required, to decide if a router may safely remove a packet from a p-cycle, mainly to prevent the formation of packet loops. A packet travels in a loop if somehow it repeatedly enters and exits a p-cycle (a packet should enter and exit a p-cycle only once.)

The rule used to prevent these loops is based on path cost. Each routing table entry for a destination IP address has a field containing the path cost from the local router to the destination. When being normally routed, the path cost of a packet's routing table entry will go down as the packet gets closer to its destination because, by design, a packet is routed towards its destination along lowest cost route. This would not be true if the cost were to increase as a packet progressed to its destination.

To prevent looping within the p-cycle care must be taken that a packet exits the p-cycle at a point that is "downhill" from the point where it entered ("downhill" in the sense that the exit point is closer to the packet's destination than the entry point.) This prevents loops because for a packet to return to the p-cycle it would effectively have to move further away from its destination; this is not possible if the packet is routed normally using lowest cost paths.

P-Cycle processing Rules at the Insertion Router

Figure 5:
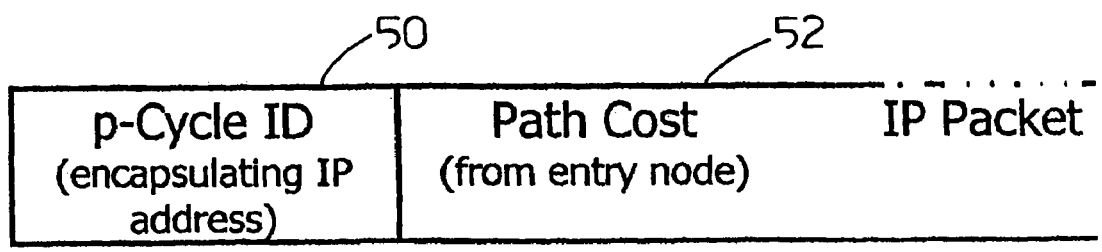
FIG. 5 shows design of a packet according to the invention.

If a router attempts to send a packet through a port but cannot because the router on the other side has been determined to be dead, the router encapsulates the original IP packet within a p-cycle packet and sets the path cost field within the p-cycle packet to equal the cost of the path the packet would have taken had the router failure not occurred. The structure of the packet is shown in FIG. 5, with p-cycle ID field 50 and path cost field 52. The p-cycle ID field 50 contains the ID of the p-cycle on which the packet belongs. The path cost field 52 contains the path cost of the original pre-failure path for the IP packet. The router then accesses the label of the p-ycle that was dedicated to protecting the failed router and inserts the p-cycle packet into the p-cycle.

P-Cycle Processing Rules at Subsequent Router on the p-Cycle

Subsequent routers, upon reception of a p-cycle packet, determine the destination address of the encapsulated IP packet and use this to access the local routing table at the subsequent router. If the entry in the local routing table for the destination node points to a dead port (presumably, due to the router failure), or there is no entry for the destination node, the router continues relaying the p-cycle packet along the cycle. If the port is not dead, the router compares the local table entry's path cost to the p-cycle packet's cost field. If the local cost is greater than or equal to packet's cost the packet is allowed to continue along the p-cycle. However, if the local cost is less than the packet's cost, the original IP packet is retrieved from the p-cycle packet and routed normally (the router's location is suitably "downhill" from the p-cycle packet's entry point, and it is safe to route the IP packet normally.)

As previously, mentioned it is guaranteed that eventually the packet will arrive at a router which can remove the packet from the p-cycle. However, to safeguard against the situation where no route off the p-cycle exists (perhaps another failure occurred, eliminating any possible route), an additional check can be introduced where each router checks if it had originally introduced the packet to the p-cycle so it can dispose of the packet if it was. This check prevents a packet from continually looping around the p-cycle. Note that this check would imply the presence of a field in a p-cycle packet which would contain the ID of the router which introduced the packet into the p-cycle.

Figure 3A:
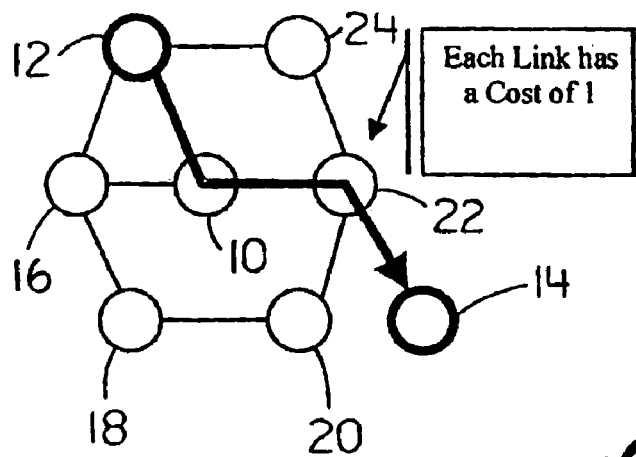
FIGS. 3A, 3B and 3C show restoration of a node failure using a p-cycle.
Figure 3B:
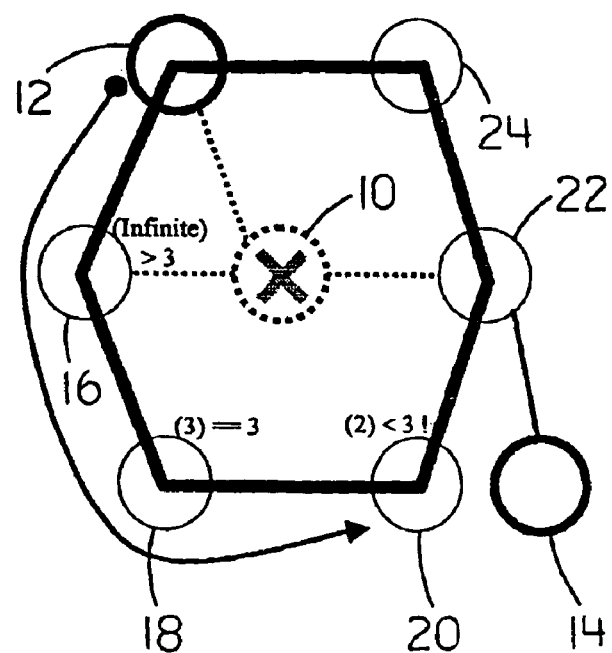
Figure 3C:
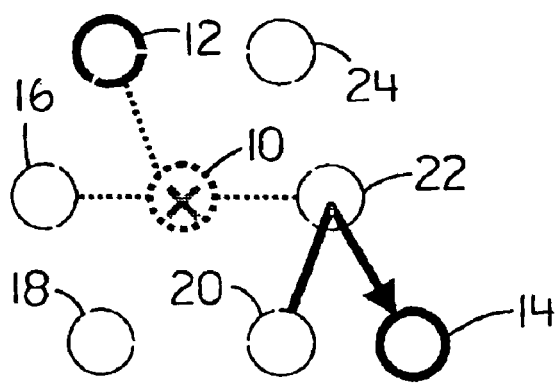

FIG. 3 gives an example of these p-cycle routing rules. In the example, a packet would originally have been traveled over the route from node 12 to node 14 given in FIG. 3a. However, a node failure at node 10 disrupts this route and forces the source router 12 to detour the packet onto a p-cycle, after encapsulating it in a p-cycle packet (FIG. 3b.) The first router 16 along the p-cycle continues to pass the packet along as the path cost it has for the packet destination is infinite (its route for the packet has also been disrupted by the failure.) The second router 18 does have a valid route for the packet but it also passes the packet along the p-cycle. The local path cost of router 18 is 3 which is equal to that of the original route and so the packet can not be safely handled using conventional routing. At the third router 20, however, the local path cost is 2 (less than the original cost of 3) and, so, the packet is routed normally to its destination node 14 (FIG. 3*c*).

Figure 6:
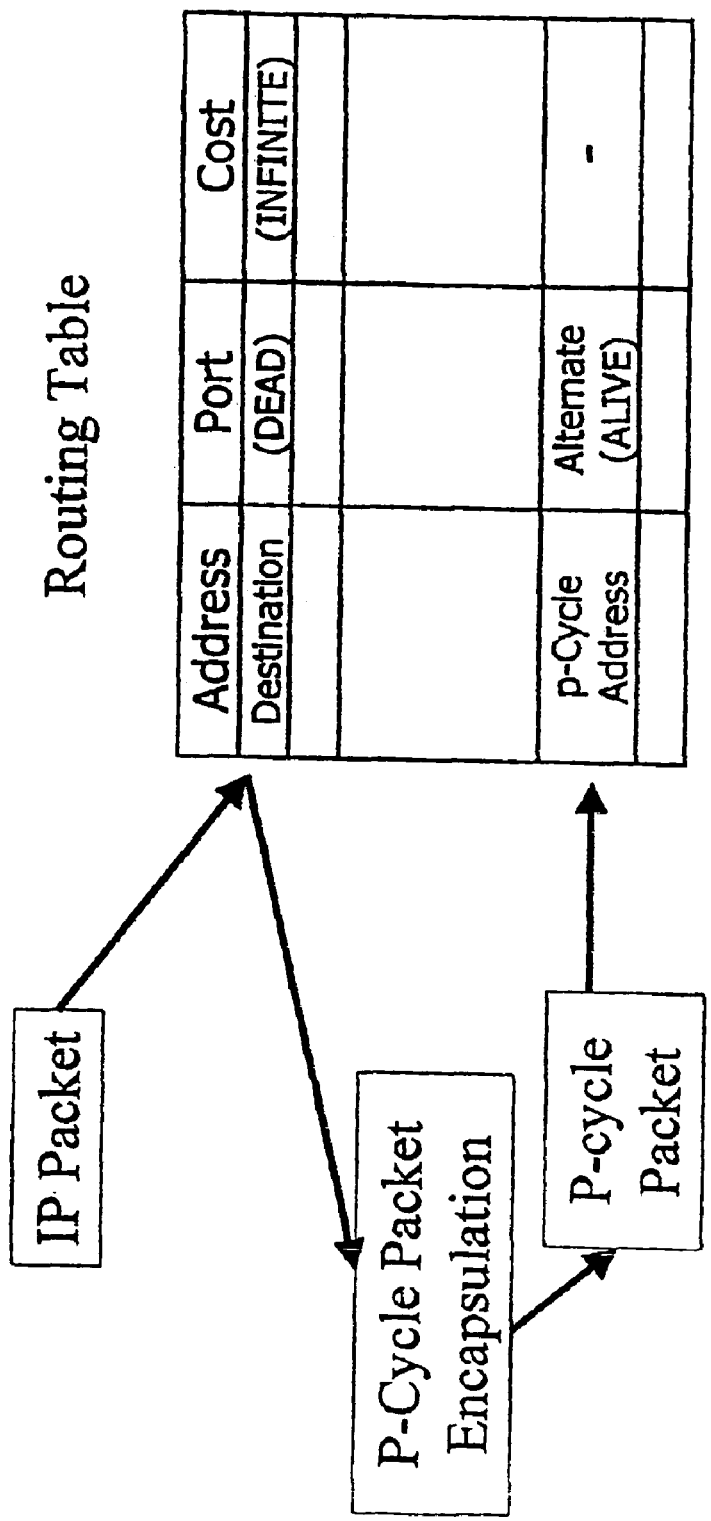
FIG. 6 shows a routing table for use in a router according to the invention.

An exemplary routing table is shown in FIG. 6. The routing table has a set of addresses, including destination addresses, and also includes a p-cycle address. For each address, there is a port ID entry, and a cost for using that port to get to the destination. The p-cycle address specifies a port leading to the next router in the p-cycle. FIG. 6 also shows schematically that if an IP packet arrives with a destination for which the corresponding port is dead, the data packet is encapsulated as a p-cycle packet and routed according to the p-cycle address entry and its corresponding port.

Considerations in Node Restorable p-Cycle Design

Two properties are required for a node to be protected by a p-cycle. The p-cycle must cover all adjacent nodes (to ensure routes between the protected node and adjacent neighbors). The p-cycle must not contain the node to be protected (so that the p-cycle is not disrupted when the node fails.) This can, however, raise issues when dealing with adjacent nodes that are of degree 2 (only 2 links terminate on the node.) The complication that arises is that the failure of a node connected to a degree 2 node will partially disconnect the node resulting in only a single access point. This problem with using p-cycles with such a site is p-cycles can only be formed with nodes that are of at least degree 2 after the node failure occurs.

Figure 4:
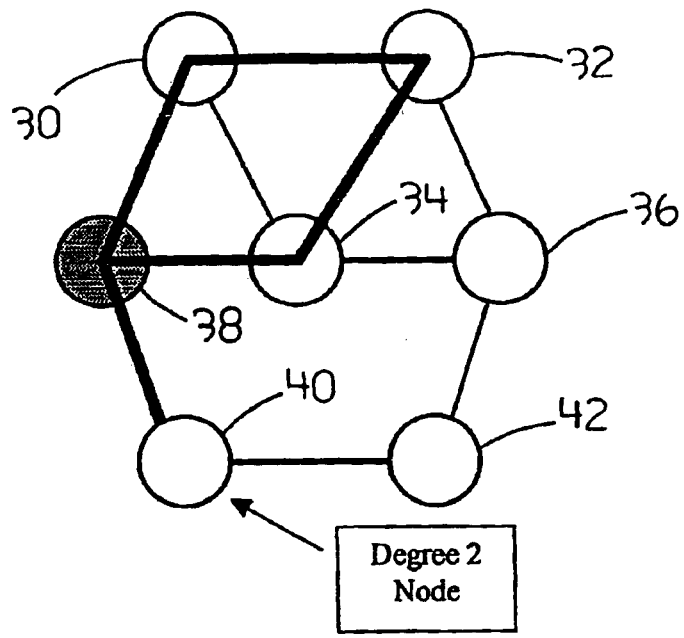
FIG. 4 shows a cycle for a node of degree 2.

This can be handled by building a p-cycle for a node failure by considering only the adjacent nodes which are of degree 3 or higher. The nodes which are of degree 2 can then be connected into the p-cycle using a point to point segment. This is a special case of a figure 8 loop in which the figure 8 loop is logically required to go down and back the same span, to include one or more degree two sites. FIG. 4 gives an example of such an arrangement. Nodes 30, 32, 34, 36 and 38 are of at least degree 3. Nodes 40 and 42 are of degree 2. Faced with a failure a degree 2 node such as node 40 encapsulates an IP packet as usual and introduces it into its part of the preconfigured segment and forwarded to node 38. From there it would be passed to the main part of the p-cycle where it would be passed along the perimeter using the normal p-cycle rules. The segment connecting nodes 38 and 40 acts as a one way entrance into the p-cycle. Once within the p-cycle a packet will only rotate around the cycle; it will not exit using the segment. Packets on the p-cycle which need to reach a degree 2 node can do this using the previously described mechanism of removal from the p-cycle from which point they will be normally routed towards the node.

Immaterial modifications may be made to the invention described here without departing from the essence of the invention.

The embodiments of the invention in which an exclusive property or privilege is claimed are defined as follows:

1. A telecommunications network, comprising:
    plural interconnected nodes forming nodes of a telecommunications network;
    plural nodes of the interconnected nodes forming a preconfigured cycle for a specific node of the telecommunications network that is not in the preconfigured cycle, the plural nodes of the preconfigured cycle including all nodes of the telecommunications network that are directly connected to the specific node;
    each of the plural nodes in the preconfigured cycle comprising a router table, each router table identifying the plural nodes of the preconfigured cycle; and
    the nodes in the preconfigured cycle being configured such that upon failure of a node not in the preconfigured cycle, data packets routed by the nodes around the preconfigured cycle contain an ID field that identifies the preconfigured cycle of nodes, a path cost field and a data field.

2. The telecommunications network of claim 1 in which:
    for any given node in the telecommunications network there is an associated preconfigured cycle, and each preconfigured cycle includes all nodes of the telecommunications network that are directly connected to the corresponding given node; and
    the nodes of a specific preconfigured cycle each comprise a router table that identifies the nodes of the specific preconfigured cycle.

3. The telecommunications network of claim 2 in which the number of preconfigured cycles in the telecommunications network is the minimum number required to provide a preconfigured cycle for each node of the telecommunications network.

4. A method of protecting against node failure in a telecommunications network, in which the telecommunications network includes plural interconnected nodes, the method comprising the steps of:
    identifying plural nodes of the interconnected nodes that form a preconfigured cycle for a specific node of the telecommunications network that is not in the preconfigured cycle, the plural nodes of the preconfigured cycle including all nodes of the telecommunications network that are directly connected to the specific node;
    providing at each of the plural nodes in the preconfigured cycle a router table, each router table identifying the plural nodes of the preconfigured cycle, and upon failure of a node not in the preconfigured cycle, routing data packets around the preconfigured cycle, in which the data-packets contain an ID field that identifies the preconfigured cycle of nodes, a path cost field and a data field.

5. The method of claim 4 further comprising the steps of:
    providing a preconfigured cycle for each given node in the telecommunications network, in which each preconfigured cycle includes all nodes of the telecommunications network that are directly connected to the given node; and
    providing at the plural nodes corresponding to each specific preconfigured cycle a router table that identifies the nodes of the specific preconfigured cycle.

6. The method of claim 5 in which the number of preconfigured cycles in the telecommunications network is the minimum number required to provide a preconfigured cycle for each node of the telecommunications network.

7. The method of claim 4 further comprising the step of:
    upon failure of a given node, routing all data packets whose preferred path includes the given node onto the preconfigured cycle corresponding to the given node.

8. The method of claim 7 in which the preferred path is the least cost path.

9. The method of claim 8 in which each node in the preconfigured cycle routes the data packet around the preconfigured cycle until the path cost from a node in the preconfigured cycle to the destination of the data packet is less than the cost of the least cost path.

10. The method of claim 7 further comprising the step of:
   at each node in the preconfigured cycle of nodes, assessing whether to continue on the preconfigured cycle of nodes or leave the preconfigured cycle of nodes at that node.

11. The method of claim 10 in which the assessment is made by assessing the cost of the route leaving the preconfigured cycle at that node.

12. The method of claim 11 in which the assessment is made by comparing the cost of the route leaving the preconfigured cycle at that node with the cost of the route had the node not failed.

13. The method of claim 7, further comprising the step of:
   removing data packets from the preconfigured cycle of nodes when data packets have returned to the entry point of the data packet onto the preconfigured cycle.

* * * * *